US011799842B2

(12) United States Patent
Gupta

(10) Patent No.: US 11,799,842 B2
(45) Date of Patent: Oct. 24, 2023

(54) MULTI-DEVICE FUNCTIONAL CODE LOGIC COMPONENTS ALLOWING MULTIPLE DEVICE COMMUNICATION ON A DISTRIBUTED DEVELOPMENT PLATFORM

(71) Applicant: BANK OF AMERICA CORPORATION, Charlotte, NC (US)

(72) Inventor: Saurabh Gupta, New Delhi (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 137 days.

(21) Appl. No.: 17/671,665

(22) Filed: Feb. 15, 2022

(65) Prior Publication Data

US 2023/0262039 A1    Aug. 17, 2023

(51) Int. Cl.
*H04L 9/40* (2022.01)
(52) U.S. Cl.
CPC .................................... *H04L 63/08* (2013.01)
(58) Field of Classification Search
None
See application file for complete search history.

(56) References Cited

U.S. PATENT DOCUMENTS

| | | | |
|---|---|---|---|
| 11,102,204 B1* | 8/2021 | Jacques de Kadt | H04L 9/3239 |
| 2017/0076518 A1* | 3/2017 | Patterson | G07C 9/22 |
| 2020/0160320 A1 | 5/2020 | Williams et al. | |
| 2020/0167365 A1* | 5/2020 | Troia | H04L 9/3239 |
| 2020/0250747 A1* | 8/2020 | Padmanabhan | G06Q 20/389 |
| 2020/0314078 A1* | 10/2020 | Nakajima | G06F 3/067 |
| 2021/0025607 A1 | 1/2021 | Torres et al. | |
| 2021/0342811 A1* | 11/2021 | Ilincic | G06Q 20/40145 |
| 2021/0357489 A1* | 11/2021 | Tali | A61B 5/349 |
| 2023/0254147 A1* | 8/2023 | Huo | H04L 9/40 |
| | | | 713/159 |

(Continued)

OTHER PUBLICATIONS

Anthony, "Distributed Ledger and Decentralised Technology Adoption for Smart Digital Transition in Collaborative Enterprise", 2021, ISSN: (Print) (Online) Journal homepage: https://www.tandfonline.com/loi/teis20 (Year: 2021).*

(Continued)

*Primary Examiner* — Hossain M Morshed
(74) *Attorney, Agent, or Firm* — Moore & Van Allen PLLC; Nicholas C. Russell

(57) ABSTRACT

Systems, computer program products, and methods are described for creating a multi-device functional code logit component allowing for multiple device communications on a distributed platform. As such, the invention allows for multiple wearable devices to each possess a unique non-fungible token (NFT) within a private distributed ledger. Each wearable device on has a unique immutable identity NFT. The grouping of NFT associated wearable devices are linked together for consensus resource distribution. Upon an initiation of a resource distribution request from a user using the user's wearable device, the other users in the distributed ledger group receive coded communications of the initiated resource distribution requiring an action approval request. If accepted action and a consensus is generated among the distributed ledger, the resource distribution is granted to the requesting wearable device.

20 Claims, 6 Drawing Sheets

(56) References Cited

U.S. PATENT DOCUMENTS

| | | | |
|---|---|---|---|
| 2023/0262039 A1* | 8/2023 | Gupta | H04L 63/08 717/103 |
| 2023/0262059 A1* | 8/2023 | Dash | H04L 47/781 726/26 |

OTHER PUBLICATIONS

Kiamari, "Blizzard: a Distributed Consensus Protocol for Mobile Devices", 2022, arXiv (Year: 2022).*

* cited by examiner

MULTI-DEVICE FUNCTIONAL CODE LOGIC COMPONENTS ALLOWING MULTIPLE DEVICE COMMUNICATION ON A DISTRIBUTED DEVELOPMENT PLATFORM

BACKGROUND

Software programming is a skilled activity where developers create source code scripts with functional code logic components based on specific requirements on various programming platforms within a distributed development platform (e.g., DevOps platform). This allows for modularization programs for linking multiple devices across a distributed development platform. Therefore, there is a need for a system for multi-device linkage using functional code logic components on a distributed development platform for resource distribution consensus across users.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Consensus for resource distribution currently requires communication between several parties that require approval. Currently, there are very few measures that can prevent or eliminate a resource distribution from occurring when a consensus is not reached. Typically a consensus is required when an entity is performing a resource distribution, a child is performing a resource distribution and needs consent, or the like. The invention utilizes software programming source code scripts with functional code logic components based on specific requirements on various programming platforms within a distributed development platform to allow for the blocking of resource distributions at a point of distribution. This allows for modularization programs for linking multiple devices across a distributed development platform for instant review and consensus.

The invention creates a multi-device functional code logit components allowing for multiple device communications on a distributed development platform. In this way, the invention allows for multiple wearable devices, such as smart watches, to enter in a non-fungible token (NFT) based distributed ledger. Each wearable device on the distributed ledger has a unique immutable identity stored as NFT. The user's unique identity will include user resource distribution account information and wearable device credentials within an NFT unit on the distributed ledger. The invention allows for linking and delinking of wearable devices to the distributed ledger via an application. The invention links a group of wearable devices on a distributed ledger. This grouping of users is based on family, friends, employment position, or the like. The group of wearable devices on the distributed ledger are linked together for consensus. Upon an initiation of a resource distribution request from a user using the user's wearable device, the other users in the distributed ledger group will receive a notification of the initiated resource distribution. This notification allows the users on the group to approve or deny the resource distribution. If all of the users approve the resource distribution via wearable devices on the distributed ledger, then a consensus is generated and the resource distribution may be initiated. If one of the users deny the resource distribution via the wearable device on the distributed ledger, the system may deny the resource distribution and prevent the transaction from occurring. Furthermore, each of the users on the resource distribution may contribute resources to the transaction associated with the resource distribution.

Upon consensus, the wearable device can transmit the NFT to a resource distribution device to provide account information and authentication for the resource distribution. In this way, the NFT carries resource account information for the transfer and an authenticated consensus for the authentication. As such, with account information being provided, the wearable device may integrate with a financial institution associated with a user and allow for authentication of the wearable device for resource distribution completion.

In some embodiments, the invention comprises a system, method, and computer program product for a multi-device functional code linkage, the invention comprising: identifying wearable devices associated with users, wherein a wearable device is associated with a user and the users are associated with a group; linking, via a distributed ledger, the wearable devices associated with the users in the group upon user approval; generating a non-fungible token (NFT) and tag each wearable device on the distributed ledger with a unique NFT associated with each wearable device; identifying a resource distribution request originating between the wearable device of the user and a point-of-distribution device; transmitting resource distribution request information from the wearable device of the user to the wearable devices associated with the users in the group for resource distribution consensus; receiving a consensus approval from the group, where the consensus is an active selection of approval of the resource distribution request on each of the wearable devices from the users not originating the resource distribution request; and unblocking a communication channel between the wearable device and the point-of-distribution device and allow resource distribution via transmission of authentication.

In some embodiments, the invention further comprises denying the communication channel between the wearable device and the point-of-distribution device and blocking the resource distribution based on not receiving consensus approval from the group.

In some embodiments, the invention further comprises allowing to split the resource distribution across the users of the group by transmission of the unique NFT from each of the wearable devices to the wearable device associated with the resource distribution request to provide the unique NFT of the wearable devices to provide account information from the wearable devices of the users of the group.

In some embodiments, the unique NFT associated with the wearable device comprises wearable device information and resource distribution account information for the user.

In some embodiments, the transmission of authentication further comprises a transmission of the NFT associated with the wearable device to the point-of-transaction device to allow for a linkage between the wearable device, the point-of-transaction device, and a financial institution device to process the resource distribution.

In some embodiments, transmitting the resource distribution request information from the wearable device of the user to the wearable devices associated with the users in the group further comprises transmitting a notification to the wearable devices of the user presenting the resource distribution type and the NFT associated with the wearable device associated with the resource distribution request.

In some embodiments, the group includes two or more users in affiliation with each other. In other embodiments, the wearable device is an electronic device comprising an NFT controller.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
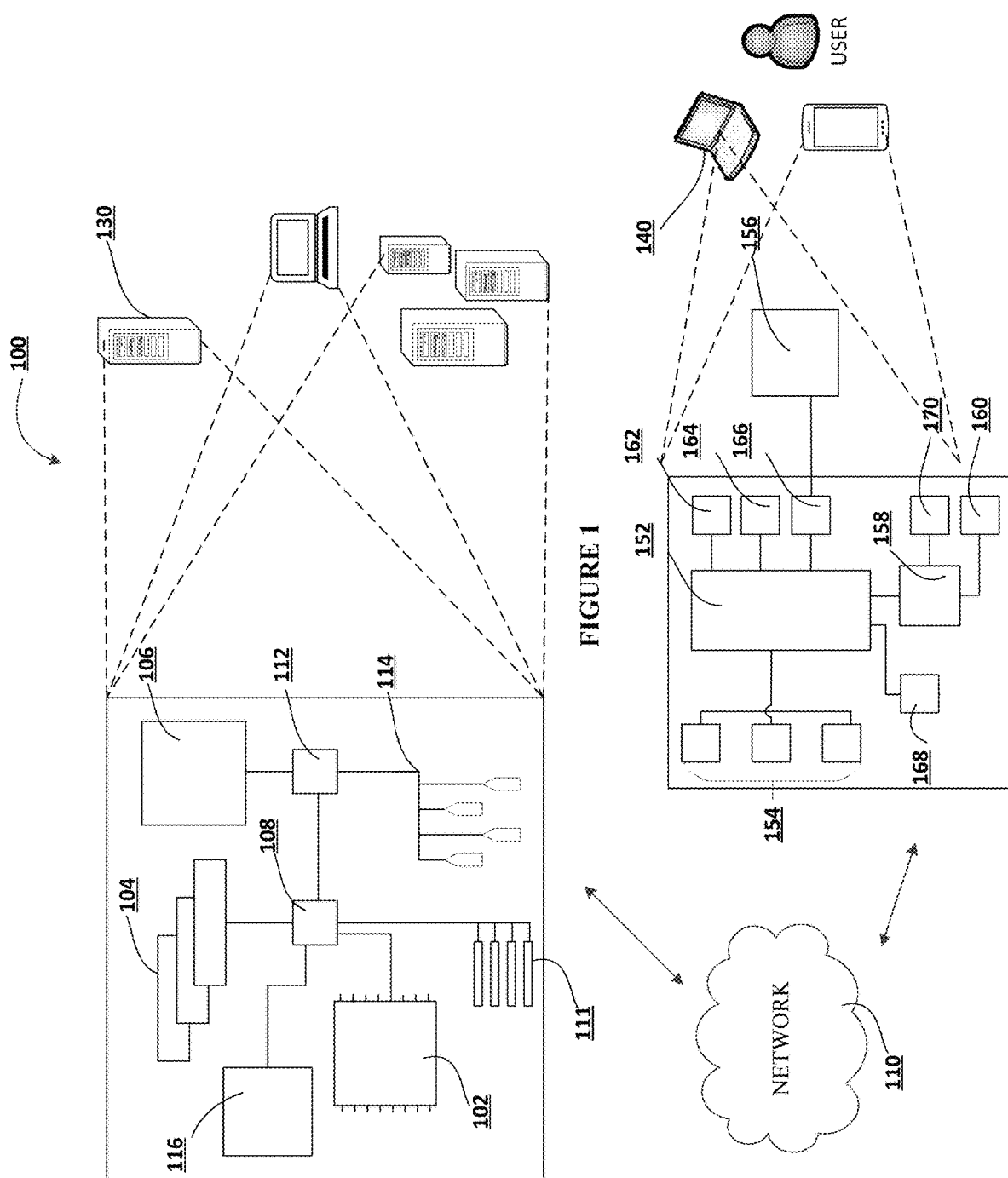
Figure 2A:
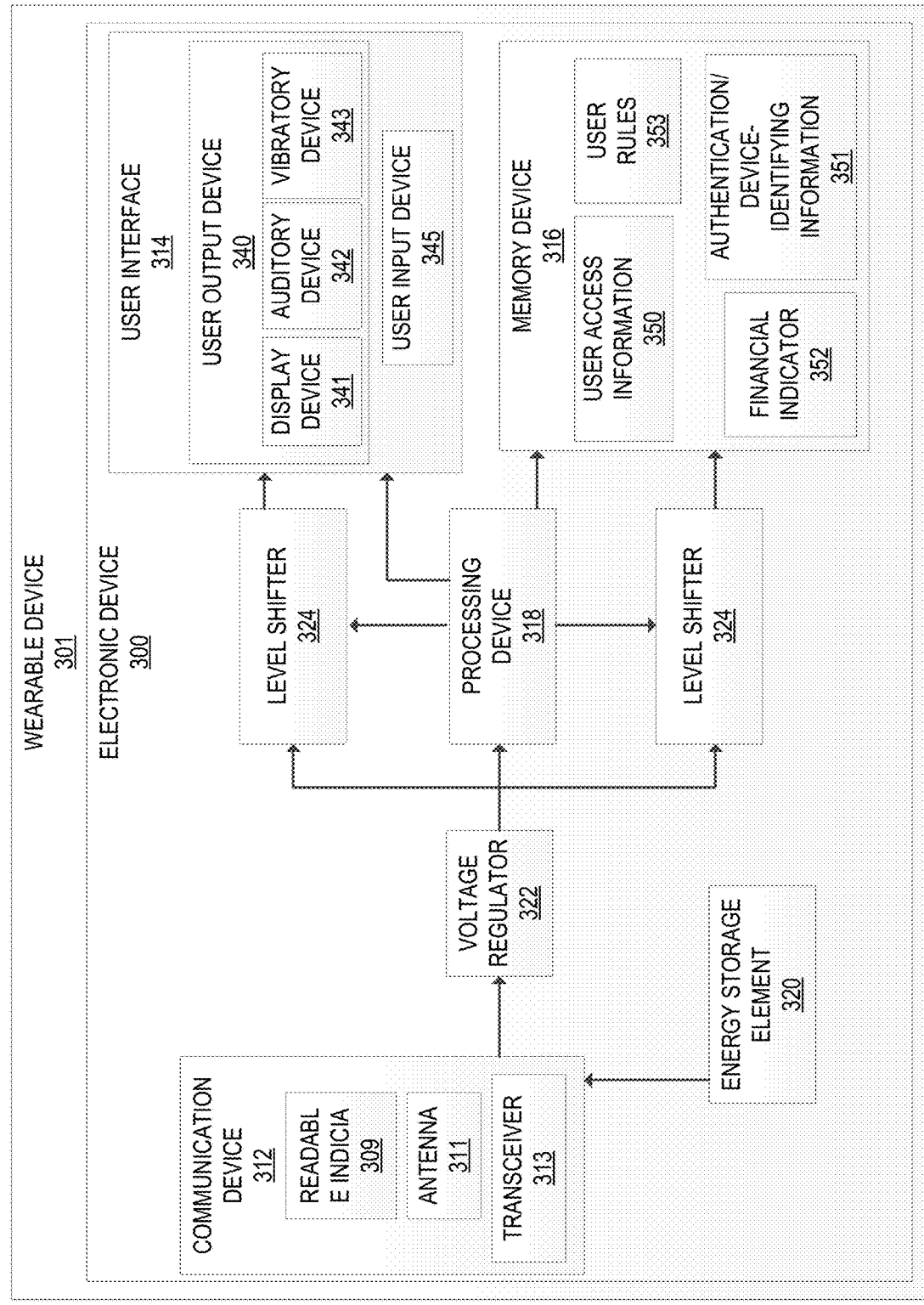
Figure 2B:
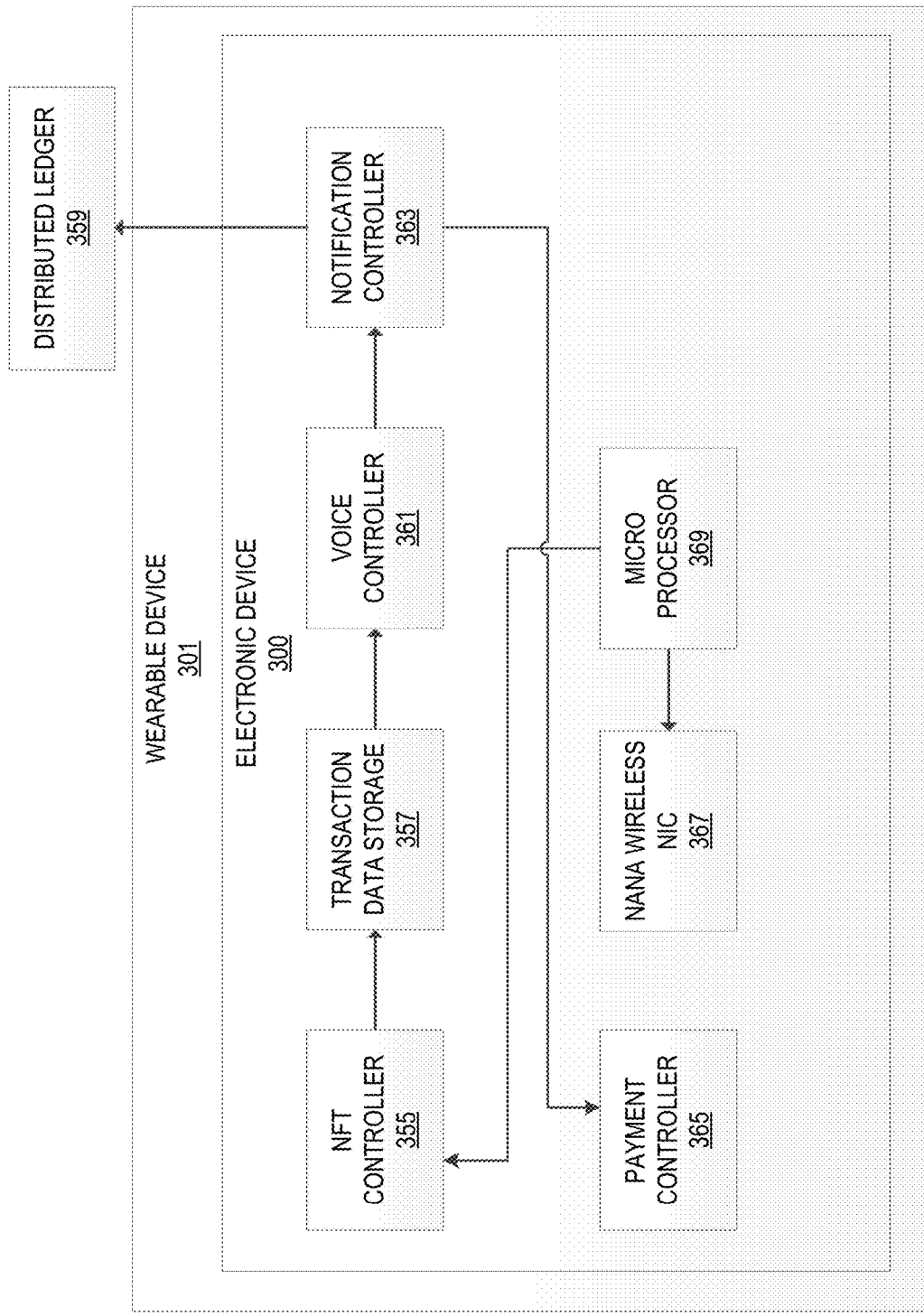
Figure 3:
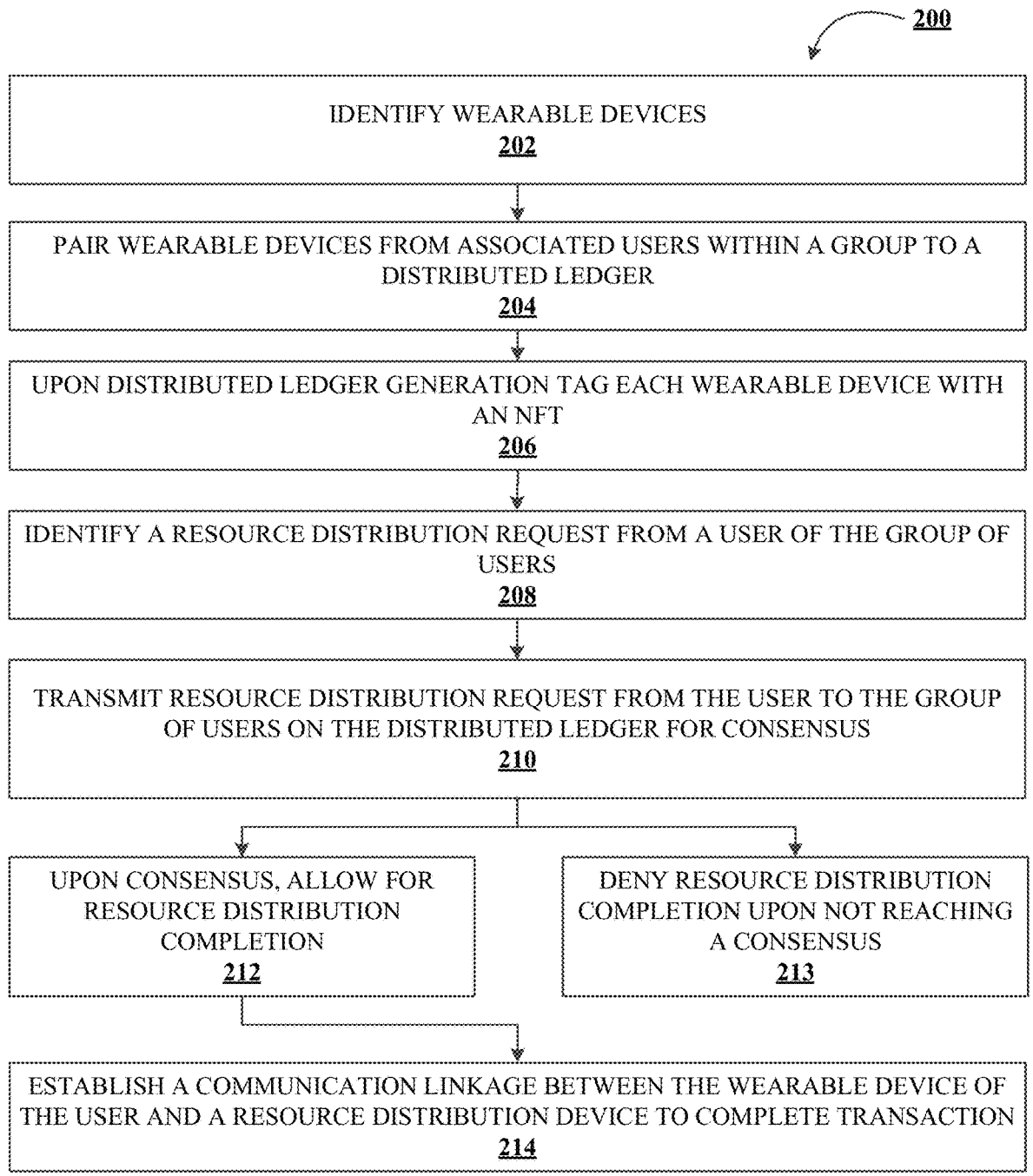
Figure 4:
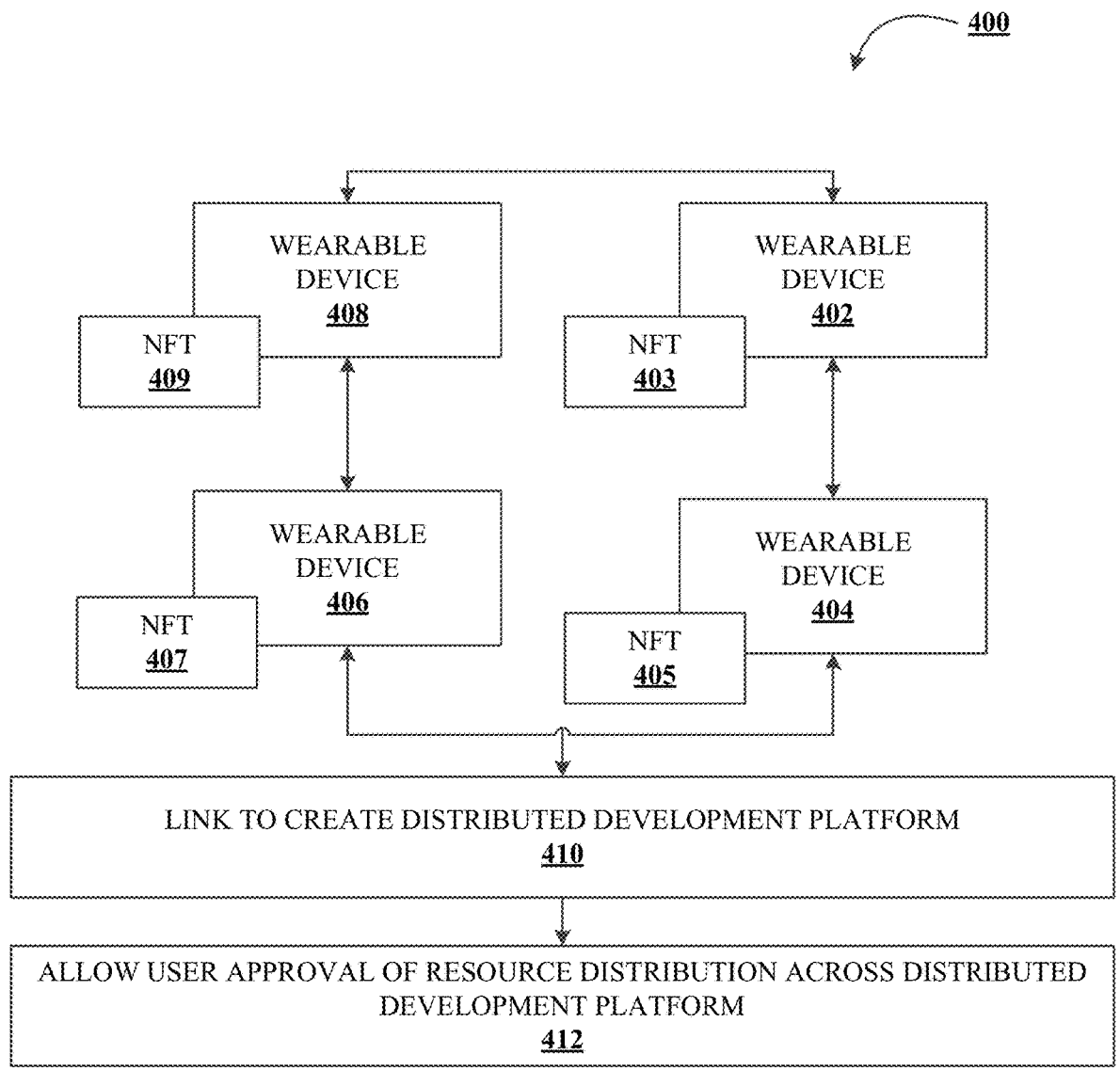
Figure 5:
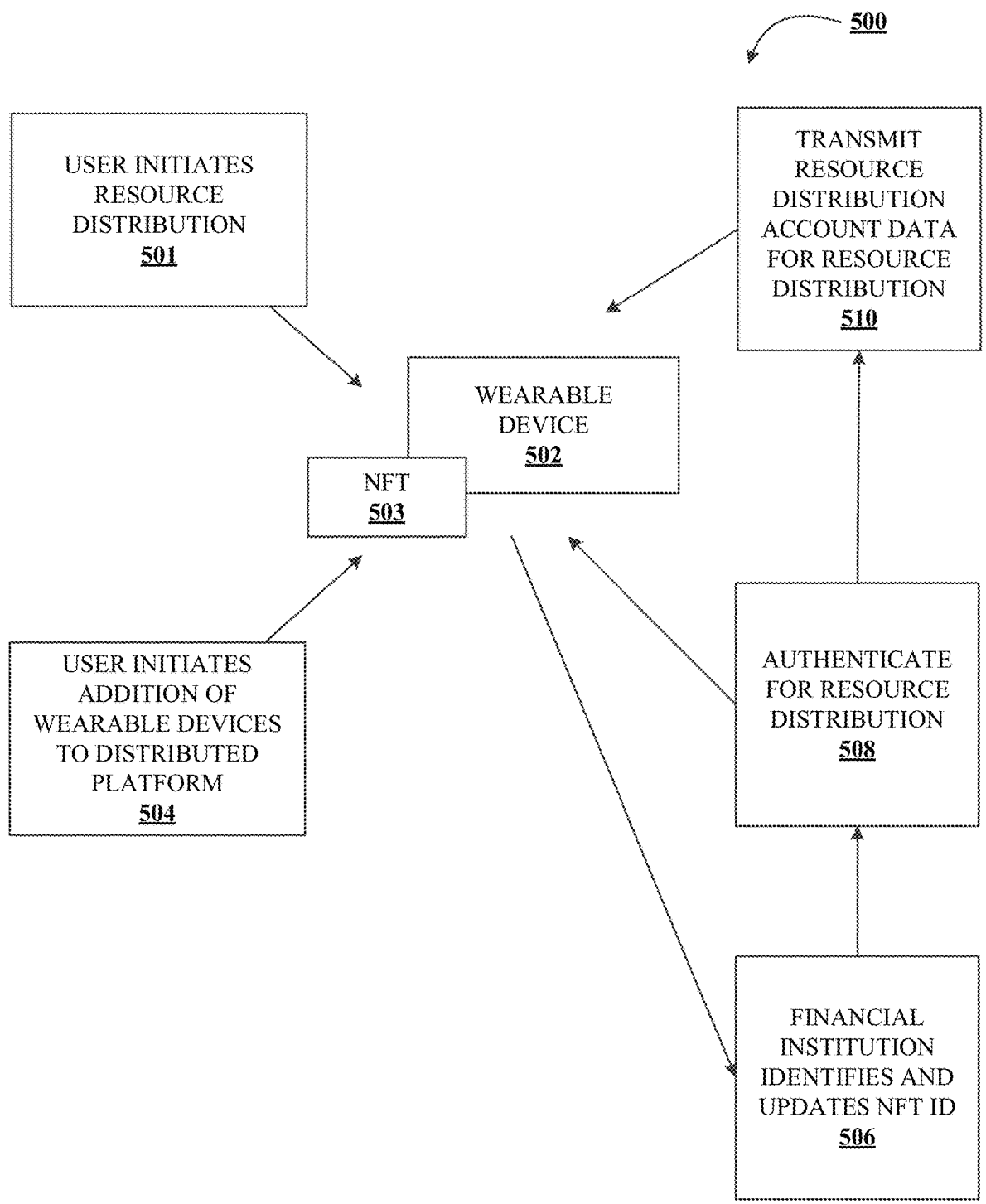

Having thus described embodiments of the invention in general terms, reference will now be made the accompanying drawings, wherein:

FIG. 1 illustrates a multi-device functional code logic for multiple device communication, in accordance with an embodiment of the invention;

FIG. 2A illustrates a wearable device system components, in accordance with an embodiment of the invention;

FIG. 2B illustrates a wearable device system component logic for multi-device functional code logic for multiple device communication, in accordance with an embodiment of the invention;

FIG. 3 illustrates a process flow for multi-device consensus request and detection for resource distribution, in accordance with an embodiment of the invention;

FIG. 4 illustrates a data flow diagram for wearable device consensus on a distributed development platform, in accordance with an embodiment of the invention; and FIG. 5 illustrates a process flow for resource distribution upon wearable device consensus, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a software code developer, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "distributed ledger" may refer to a consensus of replicated and synchronized data geographically shared across multiple nodes on a network. Without using a centralized data storage, each distributed ledger database replicates and saves an identical copy of the ledger. A distributed ledger may employ executing codes, also known as smart contracts, to manage transactions and store records of transactions among disparate participants in the distributed ledger-based network (DLN) without the need for a central authority.

As used herein, a "non-fungible token" or "NFT" may refer to a digital unit of data used as a unique digital identifier for a resource, such as functional code logic components in a source code script. An NFT may be stored on a distributed ledger that certifies ownership and authenticity of the resource, and as such, cannot be copied, substituted, or subdivided. In specific embodiments, the NFT may include at least relationship layer, a token layer, a metadata layer(s), and a licensing layer. The relationship layer may include a map of various users that are associated with the NFT and their relationship to one another. For example, if the NFT is purchased by buyer B1 from a seller S1, the relationship between B1 and S1 as a buyer-seller is recorded in the relationship layer. In another example, if the NFT is owned by O1 and the resource itself is stored in a storage facility by storage provider SP1, then the relationship between O1 and SP1 as owner-file storage provider is recorded in the relationship layer. The token layer may include a smart contract that points to a series of metadata associated with the resource, and provides information about supply, authenticity, lineage, and provenance of the resource. The metadata layer(s) may include resource descriptors that provides information about the resource itself (e.g., resource information). These resource descriptors may be stored in the same metadata layer or grouped into multiple metadata layers. The licensing layer may include any restrictions and licensing rules associated with purchase, sale, and any other types of transfer of the resource from one person to another. Those skilled in the art will appreciate that various additional layers and combinations of layers can be configured as needed without departing from the scope and spirit of the invention.

The invention utilizes software programming source code scripts with functional code logic components based on specific requirements on various programming platforms within a distributed development platform to allow for the blocking of resource distributions at a point of distribution. This allows for modularization programs for linking multiple devices across a distributed development platform for instant review and consensus. The invention creates a multi-device functional code logit components allowing for multiple device communications on a distributed development platform. In this way, the invention allows for multiple wearable devices, such as smart watches, to enter in an NFT based distributed ledger. Each wearable device on the distributed ledger has a unique immutable identity stored as NFT. The user's unique identity will include user resource distribution account information and wearable device credentials within an NFT unit on the distributed ledger. The invention allows for linking and delinking of wearable devices to the distributed ledger via an application. The invention links a group of wearable devices on a distributed ledger. This grouping of users is based on family, friends, employment position, or the like. The group of wearable devices on the distributed ledger are linked together for consensus. Upon an initiation of a resource distribution request from a user using the user's wearable device, the other users in the distributed ledger group will receive a notification of the initiated resource distribution. This notification allows the users on the group to approve or deny the resource distribution. If all of the users approve the resource distribution via wearable devices on the distributed ledger, then a consensus is generated and the resource distribution may be initiated. If one of the users deny the resource distribution via the wearable device on the distributed ledger, the system may deny the resource distribution and prevent the transaction from occurring. Furthermore, each of the users on the resource distribution may contribute resources to the transaction associated with the resource distribution.

FIG. 1 illustrates a multi-device functional code logic for multiple device communication 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of digital computers, such as laptops, desktops, video recorders, audio/video player, radio, workstations, servers, wearable devices, Internet-of-things devices, electronic kiosk devices (e.g., automated teller machine devices), blade servers, mainframes, or any combination of the aforementioned. In accordance with embodiments of the invention, the user input device 140 is intended to represent various forms of mobile devices, such as personal digital assistants, cellular telephones, smartphones, augmented reality (AR) devices, virtual reality (VR) devices, extended reality (XR) devices, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the network 110, a number of other computing devices (not shown) in addition to the user input device 140. In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units.

Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140, such as a wearable device, to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

FIG. 2A illustrates a system diagram for a user input device described above. In this embodiment, the user input device is a wearable device. The wearable device 301 generally includes an electronic device 300 portion that is configured to perform the communication and/or logic portions of the wearable device 301. The electronic device 300 may be, in whole or in part, coupled to, embedded in, placed in, and/or formed integrally with the other portions of the wearable device 301. The electronic device 300 includes, in various embodiments, a communication device 312, a user interface 314 for communication, and a memory device 316 for storing data and/or computer-executable program code. In various embodiments, the electronic device 300 includes a processing device 318, energy storage elements 320, a voltage regulator 322, and one or more level shifters 324. In some embodiments, the communication device 312 includes an antenna 311 and in some it includes a transceiver 313, wherein one or both of the antenna 311 and/or transceiver 313 are configured for short and/or long range communication. The communication device also includes readable indicia 309, which include but are not limited to a scanable code, a quick response (QR) code, image-readable code, a bar code, an image, picture, icon, or text, or the like, that is integrated with the electronic device 300 and its associated. The readable indicia 309 may be electronic or electronically produced via a user interface 314 (or more specifically a user output device 340 which includes a display device 342). In other embodiments, the readable indicia 309 is printed onto the wearable device 301 or is printed onto a sticker adhesive that is coupled to the wearable device 301. In some embodiments, the user interface 314 includes a user output device 340 having one or more of a display device 341, an auditory device 342, a vibratory device 343, some other output device or the like. In some embodiments, the user interface 314 includes a user input device 345 for receiving user input. In some embodiments, the memory device is configured to store computer-readable or computer-executable instructions and/or code. In the embodiment shown, the memory device 316 includes user access information 350, user rules 353, financial indicator 352 and an authentication/device-identifying information 351.

The user rules 353 include instructions for the user control rules such as adding or removing other wearable devices from a distributed ledger or user personal resource distribution criteria. The financial indicator 352 includes instructions for indication of the user for communication with the user and devices on the network.

The authentication/device-identifying information 351 includes data and/or instructions regarding authenticating the user with another system or another wearable device. This also includes the NFT associated with the wearable device. In other embodiments, the information 350 also includes device-identifying information 351, such as, for example, an identifier identifying the wearable device 301. For example, in one embodiment, each wearable device 301 and/or each electronic device 300 is associated with an identification number used in communication with one or more other systems. In various embodiments, the wearable device 301 may or may not include some or all of the components and instructions/code shown. For example, in some embodiments, the wearable device 301 may or may not include a display. In other embodiments, for example, the wearable device 301 is watch or wearable electronic device. In various other embodiments, numerous combinations of the discussed components and/or instructions are included.

In some embodiments of the wearable device 301, the communication device 312 of the electronic device 300 is configured for receiving an external signal from a field (not shown), typically initiated at an external system. An external power source environment may include a field that, in various embodiments, is an electro-magnetic (EM) field, a radio frequency (RF) field, some other wireless communication field, or the like. The communication device 312 is also configured for converting the electro-magnetic signal to electrical power (i.e., an electrical signal) for powering the electronic device 300. A processing device 318 may be coupled (directly or indirectly) with the electrical signal of the communication device 312. The processing device 318 may generate one or more data signals, a portion of the data signals may be coupled with the user interface 314, and another (or the same) portion of the data signals may be coupled with the memory device 316. For example, the user interface 314, in one embodiment, receives power (directly or indirectly) from or derived from the electrical signal from the communication device 312. The memory device 316, in some embodiments, receives power (directly or indirectly) from or derived from the electrical signal from the communication device 312. Responsive to the signal from the field received by the electronic device 300, in some embodiments, data can be presented by the user interface 314, and the data stored by the memory device 316 can be changed.

In one example, the output of the communication device 312 is a voltage signal, such as a DC voltage, which may include but is not limited to a low voltage such as, for example, approximately 1.25 volts. In some embodiments, for example, the electronic device 300 includes a voltage regulator 322. The voltage regulator 322 is coupled with output of the communication device 312. The voltage regulator provides a stable or regulated output voltage for use by other components within the electronic device 300. For example, the voltage regulator 322, in one embodiment, includes circuit elements such as diodes, resistors, and/or capacitors for stabilizing the output signal received from the communication device 312. The voltage regulator 322, in some embodiments, is also configured for providing a regulating voltage to the other components within the electronic device 300. The voltage regulator 322, in some embodiments, includes other circuits and/or components configured for providing a regulated voltage and/or configured for stabilizing the voltage on the output of the voltage regulator 322.

The electronic device 300 includes or is coupled with one or more energy storage elements 320, also referred to as energy storage circuits, in some circumstances. The energy storage elements 320, in some embodiments, are coupled with the output of the communication device 312. In one embodiment, for example, the energy storage element 320 couples with the communication device output in order to store energy received from the communication device 312 and provide the energy to the input of the voltage regulator 322. Alternatively or additionally in various embodiments, energy storage elements 320 are coupled with the output of the voltage regulator 322 so as to store energy and provide energy to the components downstream of the voltage regulator 322 within the electronic device 300. The energy storage elements 320, in some embodiments, include capacitors, inductors, or other energy storage elements or circuits configured for providing energy storage.

In some embodiments, for example, one or more level shifters 324, also referred to as voltage conversion circuits or voltage translator circuits, are configured to provide or create the voltage levels utilized by the user interface 314 and/or by the memory device 316. In an alternative embodiment, a voltage regulator 322 is configured to provide multiple output voltage signals 332. In such an embodiment, each output voltage signal is a different voltage level in order to supply various voltage levels as required by multiple components of the electronic device 300, such as, for example, the processing device 318, the user interface 314, and/or the memory device 316 and/or other components. In some embodiments, the one or more level shifters 324 use other circuits and/or mechanisms configured for shifting a voltage signal.

In some embodiments, the communication device 312 receives a signal from the field generated by a communication device. In some embodiments, the signal from the field is converted into electric power having varying characteristics configured such that it can be utilized by the circuit components of the electronic device 300. The processing device 318 is activated by the electric power received from the field in some embodiments.

Referring again to the embodiment shown in FIG. 2A, the processing device 318 is powered, for example, based on the energy received from an external source initiating the field. The processing device 318, in various embodiments, has one or more outputs. In one embodiment, for example, one or more outputs are coupled to the user interface 314 and provide control signals from the processing device 318 to the user interface 314. In some embodiments, the outputs include data signals and control signals, and in other embodiments, the outputs include only one or the other. In some embodiments, the outputs include control signals configured for controlling the memory device 316. The processing device 318, in some embodiments, includes other outputs which can be utilized to activate or de-activate other circuit elements within the electronic device 300, such as to selectively enable or selectively disable circuit sections of the electronic device 300 in order to conserve energy or efficiently utilize energy. The processing device 318 in various embodiments is compliant with the publicly available standards and/or specifications.

The user interface 314, in various embodiments, is collocated with the electronic device 300 on the wearable device 301, and in other embodiments, the user interface 314 is coupled with the electronic device 300 but is located separate from the electronic device 300 on or in the wearable device 301. In some embodiments, the display device 341 of the user interface 314 is or includes a persistent display which, once written, will display the desired data and will persistently maintain the display of that data until the display is re-written or otherwise changed. The display device 341, in some embodiments, is a fixed segment display, a dot matrix display, a positive or negative reflective display which can be read by the user or cardholder using ambient light, a liquid crystal display, or other display. In other embodiments, the display device 341 is a single indicator such as a light emitting diode (LED). In some embodiments, the display device 341 includes one or more indicators configured to provide different colors intended to communicate different messages to the user. In some embodiments, the wearable device 301 is configured for communicating information. In some such embodiments, the display device 341 includes one or more indicators configured for multiple color light, text, image, and the like emission. In various other embodiments, the wearable device 301 includes one or more additional indicator devices such as auditory devices 342, for example speakers and the like, and/or vibratory devices 343.

In various embodiments of the wearable device 301, the wearable device 301 is configured for wearing on various body such as the wrist or ankle or the like. In some embodiments, the wearable device 301 is or includes a charm wearable on a chain around the neck, ankle or wrist or is or includes a necklace. In other embodiments, the wearable device 301 is or includes one or more rings, a wristwatch or incorporated into a wristwatch, eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a user's person.

FIG. 2B illustrates a wearable device system component logic for multi-device functional code logic for multiple device communication, in accordance with an embodiment of the invention. As illustrated the wearable device 301 generally includes an electronic device 300 portion that is configured to perform the communication and/or logic portions of the wearable device 301. The electronic device 300 may be, in whole or in part, coupled to, embedded in, placed in, and/or formed integrally with the other portions of the wearable device 301. The electronic device 300 included a communication device, a user interface for communication, and a memory device for storing data and/or computer-executable program code. In various embodiments, the devices of the wearable device 301 perform the multi-device functional code logic for multiple device communication and consensus for resource distribution.

In addition to the devices described above, the wearable device 301 further comprises components specifically utilized to perform the functions of generating a multiple device communication across a distributed network for resource distribution consensus. These components include a wireless nic 367 within the communication device 312 for communication in addition to the communications described above, a micro processor 369 specifically dedicated to generation and communication across a distributed ledger platform.

Furthermore, the electronic device 300 further comprises an NFT controller 355. The NFT controller 355 stores the unique NFT associate with the wearable device 301. The NFT controller 355 further allows for storage of wearable device 301 information, resource distribution account information, and authentication or consensus information for a resource distribution. The NFT controller 355 is in communication with the micro processor 369 and transaction data storage 357 for NFT generation and deployment. The wearable device 301 also comprises a payment controller 365 that is in communication with a financial institution to identify and provide the wearable device with account information to complete a resource distribution. Furthermore, the wearable device 301 may store transaction data associated with completed transactions using that account information in the transaction data storage 357. The wearable device 301 allows for user communication via a voice controller 361, allowing a user to communicate via voice commands or via a display. Finally, the notification controller 363 links to the distributed ledger 359 to notify the user of approvals or denials of the transaction request across the other wearable devices on the distributed ledger.

FIG. 3 illustrates a process flow for multi-device consensus request and detection for resource distribution 200, in accordance with an embodiment of the invention. As illustrated in block 202, the process 200 is initiated by identifying wearable devices. In this way, the system may identify wearable devices associated with users across an entity, a family, or a group of individuals. In this way, the system identifies wearable devices potentially associated with each other based on geographical location, type of data being input or transmitted, names associated with the wearable device, or user input.

As illustrated in block 204, the system may pair wearable devices from associated users within a group on a distributed ledger. In this way, a user or group of users select to be part of a group on a distributed ledger. This group performs a review of transactions associated with each user to confirm or deny the completion of the transaction. The group may be made of up individuals associated with an entity that requires the group of individuals to agree prior to a transaction being made. In some embodiments, the group may be made up of individuals associated with a family that requires a parent or guardian to approve a transaction being made. In some embodiments, the group may be made up of individual users wishing to split a resource requirement associated with a transaction, such as to split the cost of a meal or the like. The system may allow the wearable devices to be linked and generate a private distributed ledger associated with the group of devices. Each wearable device may be associated with one or more distributed ledgers and may be identified based on a unique NFT generated for that wearable device on that specific ledger.

As illustrated in block 206, the process 200 continues by tagging each of the wearable devices on the distributed ledger with an NFT. Each NFT is unique to the wearable device on the distributed ledger. As such, tagging the wearable device on the distributed ledger with the NFT allows for identification of each wearable device performing an action on the distributed ledger. The NFT provides a unique identifier of the wearable device, information about the wearable device, information about the user, resource distribution account information, and authentication of the group for transaction completion.

Next, as illustrated in block 208, the process 200 continues by identifying a resource distribution request being initiated from a user associated with the group of users with wearable devices on the distributed ledger. This initiation of resource distribution typically occurs at a point-of-transaction (POT) device or another device at a merchant location. The resource distribution is initiated by the user by using the user's wearable device in order to initiate a transaction. The wearable device may be in communication with the merchant device to provide account information, such as a credit card account, to the merchant to complete a transaction. In this way, the wearable device, as described above, stores user mobile wallet information, such as payment account information within the memory device to provide resource distribution information to the entity to complete a transaction.

Upon an indication of a resource transaction initiation, the system triggers an alert to the group of users on the distributed ledger. In this way, the system transmits the resource distribution request from the user to the group of users on the distributed ledger for consensus, as illustrated in block 210.

In this way, once the resource distribution request is made by a user, the wearable device of the user transmits the resource distribution request to the distributed ledger. The distributed ledger then notifies the other wearable devices on the distributed ledger. The other wearable devices are associated with users within with group of users affiliated with the user initiating the resource distribution. The wearable devices of the group then generate a notification to the users. The notification sent to the users include information about the user initiating the request, a merchant associated with the request, an amount associated with the request, and the products or services associated with the request.

At this point, each user within the group may select to approve or deny the resource distribution. If one of the users deny the resource distribution, the system may notify the wearable device attempting to perform the resource distribution and block it from providing payment information for completing the transaction. As such, the system may prevent the user from performing a resource distribution without the group of users consenting and confirming the resource distribution. As illustrated in block 213, the system may deny the resource distribution completion upon not reaching a consensus among the users. In this way, if one user does not approve the resource distribution, the system does not allow the user's wearable device to complete the transaction at the merchant POT.

In some embodiments, each member of the group of users may approve the resource distribution. As illustrated in block 212, the system identifies a consensus that all of the users within the group approve the resource distribution. In this way, upon the consensus, the system allows for the resource distribution to be completed. As such, the system allows the wearable device of the user to complete the resource distribution at the POT. Finally, as illustrated in block 214, the system may establish a communication linkage between the wearable device of the user and a resource distribution device to complete the transaction. In this way, the system allows for the wearable device to link directly to the device associated with the resource distribution device in order to transmit account information to complete the transaction.

FIG. 4 illustrates a data flow diagram for wearable device consensus on a distributed development platform 400, in accordance with an embodiment of the invention. In this way, NFT based wearable devices are linked and added to a distributed ledger within a group. Each wearable device has a unique NFT identification associated with it. In the example provided in FIG. 4, there are four users with wearable devices, wearable device 408, wearable device 402, wearable device 406, and wearable device 404. Each wearable device has a unique NFT identifier, wearable device 408 has a unique NFT 409, wearable device 402 has a unique NFT 403, wearable device 406 has a unique NFT 407, and wearable device 404 has a unique NFT 405. Each are linked to create a distributed development platform or distrusted ledger, as illustrated in block 410. As illustrated in block 412, the system allows for the users in the group to approve the resource distribution across the distributed ledger platform.

The user associated with wearable device 408 is attempting to complete a resource distribution. Wearable device 402, wearable device 406, and wearable device 406 each received a communication notification notifying the users associated with the wearable devices that the user associated with wearable device 408 is attempting to complete a resource distribution. Each user associated with the wearable devices must respond to the notification and either approved the resource distribution or deny the resource distribution. If one of the users denies the resource distribution, the system will prevent the wearable device 408 from presenting a resource distribution account to the entity device. However, if all of the users associated with wearable device 402, wearable device 406, and wearable device 406 approve the resource distribution, the system allows for wearable device 408 to transmit resource distribution information to the merchant to complete the transaction.

FIG. 5 illustrates a process flow for resource distribution upon wearable device consensus 500, in accordance with an embodiment of the invention. In some embodiments, the NFT based wearable devices are positioned within a distributed ledger and added to the distributed ledger by users via an application. As illustrated in block 504, the user initiates an addition of a wearable device to the distributed ledger platform. This could be for another user to be added to the platform or the user associated with the request to be added to the platform. The users added to the platform may be from the same entity, family, or the like where approval from all the members on the platform are required for resource distributions. The wearable device 503 associated with the user, once added, receives a unique NFT 503. The NFT 503 provides information about the wearable device, the user, and the user account. As such, the NFT 503 is also trackable to determine approvals or denials of the transaction by the users on the distributed ledger.

As illustrated in block 501, once the private distributed ledger is created with wearable devices with a unique NFT associated therewith, a user associated with the distributed ledger may initiate a resource distribution. In this way, the user initiates a resource distribution at a POT. The NFT identification is transmitted to the financial institutions and allows for the financial institution to identify and update the NFT identification associated with the user initiating the transaction, as illustrated in block 506. Next, as illustrated in block 508, the process 500 continues by authenticating the wearable device using the NFT to initiate the resource distribution and providing that authentication from the financial institution to the wearable device 502 and the POT device for completion of the transaction. In this way, the system allows the financial institution to transmit user account details back to wearable device for payment initiation, as illustrated in block 510.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for multi-device functional code linkage, the system comprising:
   a memory device with computer-readable program code stored thereon;
   a communication device;
   a processing device operatively coupled to the memory device and the communication device, wherein the processing device is configured to execute the computer-readable program code to:
   identify wearable devices associated with users, wherein a wearable device is associated with a user and the users are associated with a group;
   link, via a distributed ledger, the wearable devices associated with the users in the group upon user approval;
   generate a non-fungible token (NFT) and tag each wearable device on the distributed ledger with a unique NFT associated with each wearable device;
   identify a resource distribution request originating between the wearable device of the user and a point-of-distribution device;
   transmit resource distribution request information from the wearable device of the user to the wearable devices associated with the users in the group for resource distribution consensus;
   receive a consensus approval from the group, where the consensus is an active selection of approval of the resource distribution request on each of the wearable devices from the users not originating the resource distribution request; and
   unblock a communication channel between the wearable device and the point-of-distribution device and allow resource distribution via transmission of authentication.

2. The system of claim 1, further comprising denying the communication channel between the wearable device and the point-of-distribution device and blocking the resource distribution based on not receiving consensus approval from the group.

3. The system of claim 1, further comprising allowing to split the resource distribution across the users of the group by transmission of the unique NFT from each of the wearable devices to the wearable device associated with the resource distribution request to provide the unique NFT of the wearable devices to provide account information from the wearable devices of the users of the group.

4. The system of claim 1, wherein the unique NFT associated with the wearable device comprises wearable device information and resource distribution account information for the user.

5. The system of claim 1, wherein the transmission of authentication further comprises a transmission of the NFT associated with the wearable device to the point-of-transaction device to allow for a linkage between the wearable device, the point-of-transaction device, and a financial institution device to process the resource distribution.

6. The system of claim 1, wherein transmitting the resource distribution request information from the wearable device of the user to the wearable devices associated with the users in the group further comprises transmitting a notification to the wearable devices of the user presenting the resource distribution type and the NFT associated with the wearable device associated with the resource distribution request.

7. The system of claim 1, the group includes two or more users in affiliation with each other.

8. The system of claim 1, wherein the wearable device is an electronic device comprising an NFT controller.

9. A computer program product for multi-device functional code linkage with at least one non-transitory computer-readable medium having computer-readable program code portions embodied therein, the computer-readable program code portions comprising:
   an executable portion configured for identifying wearable devices associated with users, wherein a wearable device is associated with a user and the users are associated with a group;
   an executable portion configured for linking, via a distributed ledger, the wearable devices associated with the users in the group upon user approval;
   an executable portion configured for generating a non-fungible token (NFT) and tag each wearable device on the distributed ledger with a unique NFT associated with each wearable device;
   an executable portion configured for identifying a resource distribution request originating between the wearable device of the user and a point-of-distribution device;
   an executable portion configured for transmitting resource distribution request information from the wearable device of the user to the wearable devices associated with the users in the group for resource distribution consensus;

an executable portion configured for receiving a consensus approval from the group, where the consensus is an active selection of approval of the resource distribution request on each of the wearable devices from the users not originating the resource distribution request; and an executable portion configured for unblocking a communication channel between the wearable device and the point-of-distribution device and allow resource distribution via transmission of authentication.

10. The computer program product of claim 9, further comprising an executable portion configured for denying the communication channel between the wearable device and the point-of-distribution device and blocking the resource distribution based on not receiving consensus approval from the group.

11. The computer program product of claim 9, further comprising an executable portion configured for allowing to split the resource distribution across the users of the group by transmission of the unique NFT from each of the wearable devices to the wearable device associated with the resource distribution request to provide the unique NFT of the wearable devices to provide account information from the wearable devices of the users of the group.

12. The computer program product of claim 9, wherein the unique NFT associated with the wearable device comprises wearable device information and resource distribution account information for the user.

13. The computer program product of claim 9, wherein the transmission of authentication further comprises a transmission of the NFT associated with the wearable device to the point-of-transaction device to allow for a linkage between the wearable device, the point-of-transaction device, and a financial institution device to process the resource distribution.

14. The computer program product of claim 9, wherein transmitting the resource distribution request information from the wearable device of the user to the wearable devices associated with the users in the group further comprises transmitting a notification to the wearable devices of the user presenting the resource distribution type and the NFT associated with the wearable device associated with the resource distribution request.

15. A computer-implemented method for multi-device functional code linkage, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

identifying wearable devices associated with users, wherein a wearable device is associated with a user and the users are associated with a group;

linking, via a distributed ledger, the wearable devices associated with the users in the group upon user approval;

generating a non-fungible token (NFT) and tag each wearable device on the distributed ledger with a unique NFT associated with each wearable device;

identifying a resource distribution request originating between the wearable device of the user and a point-of-distribution device;

transmitting resource distribution request information from the wearable device of the user to the wearable devices associated with the users in the group for resource distribution consensus;

receiving a consensus approval from the group, where the consensus is an active selection of approval of the resource distribution request on each of the wearable devices from the users not originating the resource distribution request; and unblocking a communication channel between the wearable device and the point-of-distribution device and allow resource distribution via transmission of authentication.

16. The computer-implemented method of claim 15, further comprising denying the communication channel between the wearable device and the point-of-distribution device and blocking the resource distribution based on not receiving consensus approval from the group.

17. The computer-implemented method of claim 15, further comprising allowing to split the resource distribution across the users of the group by transmission of the unique NFT from each of the wearable devices to the wearable device associated with the resource distribution request to provide the unique NFT of the wearable devices to provide account information from the wearable devices of the users of the group.

18. The computer-implemented method of claim 15, wherein the unique NFT associated with the wearable device comprises wearable device information and resource distribution account information for the user.

19. The computer-implemented method of claim 15, wherein the transmission of authentication further comprises a transmission of the NFT associated with the wearable device to the point-of-transaction device to allow for a linkage between the wearable device, the point-of-transaction device, and a financial institution device to process the resource distribution.

20. The computer-implemented method of claim 15, wherein transmitting the resource distribution request information from the wearable device of the user to the wearable devices associated with the users in the group further comprises transmitting a notification to the wearable devices of the user presenting the resource distribution type and the NFT associated with the wearable device associated with the resource distribution request.

* * * * *